United States Patent
Huang

(10) Patent No.: US 10,218,477 B2
(45) Date of Patent: Feb. 26, 2019

(54) METHOD FOR DETERMINING CHANNEL QUALITY AND APPARATUS THEREOF

(71) Applicant: Beijing Zhigu Rui Tuo Tech Co., Ltd., Beijing (CN)

(72) Inventor: Weicai Huang, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 134 days.

(21) Appl. No.: 15/218,960

(22) Filed: Jul. 25, 2016

(65) Prior Publication Data

US 2017/0033905 A1 Feb. 2, 2017

(30) Foreign Application Priority Data

Jul. 31, 2015 (CN) .......................... 2015 1 0463050

(51) Int. Cl.
*H04W 4/00* (2018.01)
*H04L 5/00* (2006.01)
(Continued)

(52) U.S. Cl.
CPC .......... *H04L 5/0048* (2013.01); *H04L 1/0015* (2013.01); *H04L 1/0027* (2013.01);
(Continued)

(58) Field of Classification Search
None
See application file for complete search history.

(56) References Cited

U.S. PATENT DOCUMENTS

2009/0052357 A1* 2/2009 Suo .......................... H04L 5/006
370/280
2010/0315962 A1* 12/2010 Imai ..................... H04B 7/2615
370/252
(Continued)

FOREIGN PATENT DOCUMENTS

CN 1946015 A 4/2007
CN 101471758 A 7/2009
(Continued)

*Primary Examiner* — Anh Vu H Ly
(74) *Attorney, Agent, or Firm* — Sheppard, Mullin, Richter & Hampton LLP

(57) ABSTRACT

Embodiments of the present application disclose a method and an apparatus for determining channel quality. The method comprises: at the same time when a data symbol is sent to a receiver by using a channel, receiving at least one reference signal by using the channel; and determining, at least according to the at least one reference signal, quality of the channel at a corresponding moment when the data symbol is sent to the receiver. The method and the apparatus in the embodiments of the present application can avoid delay and latency problems in estimation of channel quality because a reference signal and data are separately sent in different subframes, thereby improving the real-time performance and accuracy of determining channel quality; moreover, the granularity of determining channel quality is within a same subframe or even each symbol, and in this way, in a process of transmitting a piece of data, quality of a radio channel at different moments may be estimated, so that changes of the quality of the radio channel during an entire sending time can be determined more precisely.

30 Claims, 6 Drawing Sheets

S120: At the same time when a data symbol is sent to a receiver by using a channel, receive at least one reference signal by using the channel S140: Determine, at least according to the at least one reference signal, quality of the channel at a corresponding moment when the data symbol is sent to the receiver

(51) Int. Cl.
*H04L 1/00* (2006.01)
*H04L 1/08* (2006.01)
*H04L 1/18* (2006.01)

(52) U.S. Cl.
CPC .............. *H04L 1/08* (2013.01); *H04L 1/1825* (2013.01); *H04L 1/1887* (2013.01); *H04L 1/1896* (2013.01)

(56) References Cited

U.S. PATENT DOCUMENTS

| | | | | |
|---|---|---|---|---|
| 2011/0116438 A1* | 5/2011 | Tsunekawa | ........... | H04B 7/0413 370/312 |
| 2012/0281650 A1* | 11/2012 | Ouchi | ................... | H04W 52/04 370/329 |
| 2013/0301486 A1* | 11/2013 | Kishiyama | ............ | H04L 5/0007 370/277 |
| 2014/0018010 A1 | 1/2014 | Gao | | |
| 2016/0099802 A1* | 4/2016 | Noh | .................... | H04W 72/042 370/277 |
| 2017/0033897 A1* | 2/2017 | Huang | .................. | H04L 5/0044 370/329 |
| 2017/0339674 A1* | 11/2017 | Hoshino | ............... | H04W 72/04 370/329 |

FOREIGN PATENT DOCUMENTS

| | | |
|---|---|---|
| CN | 102158441 A | 8/2011 |
| CN | 102598819 A | 7/2012 |
| CN | 102983944 A | 3/2013 |
| CN | 103036835 A | 4/2013 |
| CN | 103460780 A | 12/2013 |

* cited by examiner

METHOD FOR DETERMINING CHANNEL QUALITY AND APPARATUS THEREOF

TECHNICAL FIELD

The present application relates to the field of communications technologies, and in particular, to a method and an apparatus for determining channel quality.

BACKGROUND

Future wireless communications services have a very high requirement for end-to-end quality of service (QoS). For example, in a scenario such as remote manipulation of a surgical device or remote manipulation of an automobile, an end-to-end delay needs to be within 1 ms to avoid the hysteresis during an operation. To implement a very high QoS requirement, there are multiple technical challenges, one of which is that channel quality needs to be accurately determined, so as to determine a suitable manner to perform data transmission.

In an existing Long Term Evolution (LTE) time division duplexing (TDD) technology, a dedicated reference signal is designed and is used to determine channel quality. However, in a TDD system, a reference signal used to determine channel quality and data that needs to be transmitted between two parties of communication are separately sent in different subframes. When the foregoing data is sent according to channel quality obtained by receiving a reference signal, a channel condition may be already changed. In this case, if the data is still sent according to the previously obtained channel quality, probably a QoS requirement cannot be met.

SUMMARY

In view of this, one objective of embodiments of the present application is to provide a new solution for determining channel quality.

To implement the foregoing objective, according to a first aspect of the embodiments of the present application, a method for determining channel quality is provided, the method comprising:

at the same time when a data symbol is sent to a receiver by using a channel, receiving at least one reference signal by using the channel; and determining, at least according to the at least one reference signal, quality of the channel at a corresponding moment when the data symbol is sent to the receiver.

According to a second aspect of the embodiments of the present application, an auxiliary method for determining channel quality is provided, the method comprising:

generating at least one reference signal, where the at least one reference signal is used for a sender to determine, at least according to the at least one reference signal, quality of a channel at a corresponding moment when a data symbol is sent to a receiver; and at the same time when the sender sends the data symbol by using the channel, sending the generated at least one reference signal by using the channel.

According to a third aspect of the present application, an apparatus for determining channel quality is provided, the apparatus comprising:

a first receiving module, configured to: at the same time when a data symbol is sent to a receiver by using a channel, receive at least one reference signal by using the channel; and a first determining module, configured to determine, at least according to the at least one reference signal, quality of the channel at a corresponding moment when the data symbol is sent to the receiver.

According to a fourth aspect of the present application, an auxiliary apparatus for determining channel quality is provided, the apparatus comprising:

a generation module, configured to generate at least one reference signal, where the at least one reference signal is used for a sender to determine, at least according to the at least one reference signal, quality of a channel at a corresponding moment when a data symbol is sent to a receiver; and a second sending module, configured to: at the same time when the sender sends the data symbol by using the channel, send the generated at least one reference signal by using the channel.

According to a fifth aspect of the present application, an apparatus for determining channel quality is provided, the apparatus comprising:

a transceiver, configured to: at the same time when a data symbol is sent to a receiver by using a channel, receive at least one reference signal by using the channel;

a memory, configured to store an instruction; and a processor, configured to execute the instruction stored in the memory, where the instruction causes the processor to execute the following steps:

controlling the transceiver to: at the same time when the data symbol is sent to the receiver by using the channel, receive the at least one reference signal by using the channel; and determining, at least according to the at least one reference signal, quality of the channel at a corresponding moment when the data symbol is sent to the receiver.

According to a sixth aspect of the present application, an auxiliary apparatus for determining channel quality is provided, the apparatus comprising:

a transceiver, configured to: at the same time when a data symbol is sent to a receiver by using a channel, receive at least one reference signal by using the channel;

a memory, configured to store an instruction; and a processor, configured to execute the instruction stored in the memory, where the instruction causes the processor to execute the following steps:

controlling the transceiver to: at the same time when the data symbol is sent to the receiver by using the channel, receive the at least one reference signal by using the channel; and determining, at least according to the at least one reference signal, quality of the channel at a corresponding moment when the data symbol is sent to the receiver.

In the method and the apparatus according to the embodiments of the present application, a standby device is kept in a sleep state, and when the standby device is being called or is about to be called, the standby device is activated, so that power consumption caused by unnecessary listening of the standby device can be saved.

DETAILED DESCRIPTION

Specific implementations of the present invention are further described in detail below with reference to the accompanying drawings and embodiments. The following embodiments are intended to describe the present invention, but not to limit the scope of the present invention.

A person skilled in the art may understand that the terms "first" and "second" in the present application are merely used to distinguish different devices, modules or parameters, but do not represent any particular technical meanings, and do not represent a necessary logic order among the devices, modules, or parameters.

Figure 1:
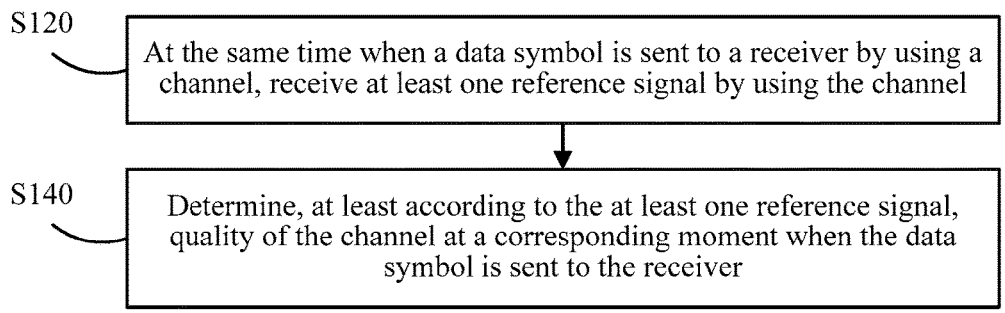
FIG. 1 is a flowchart of an example of a method for determining channel quality according to an embodiment of the present application.

FIG. 1 is a flowchart of a method for determining channel quality according to an embodiment of the present application. As shown in FIG. 1, the method comprises:

S120. At the same time when a data symbol is sent to a receiver by using a channel, receive at least one reference signal by using the channel.

S140. Determine, at least according to the at least one reference signal, quality of the channel at a corresponding moment when the data symbol is sent to the receiver.

The method in this embodiment may be executed by a device in a co-time co-frequency full duplex (CCFD) mode in a TDD system, for example, is executed by a sender device in a process of wireless data transmission. Such a sender device may comprise a base station and any wireless terminal device. The base station may comprise, may be implemented as, or may be referred to as a node B, an evolved node B (eNode B), a radio network controller (RNC), a base station controller (BSC), a base transceiver station (BTS), a base station (BS), a transceiver function (TF), a wireless router, a wireless transceiver, a basic service set (BSS), an extended service set (ESS), a radio base station (RBS), or some other terms. The wireless terminal device may comprise, may be implemented as, or may be referred to as a user station, a user unit, a mobile station, a remote station, a remote terminal, a user terminal, a user agent, a user apparatus, user equipment, a user station, or some other terms. Such a terminal device may comprise a cellular telephone, a session initiate protocol (SIP) telephone, a wireless local loop (WLL) station, a personal digital assistant (PDA), a handheld device having a wireless connection capability, a station (STA), or another possible wireless device that can perform wireless data transmission.

Moreover, in the method in this embodiment, the channel may also be distinguished by using frequency (or may be referred to as a frequency channel). Same channels mean channels having same frequency or close frequency. The "close" means that a frequency deviation does not exceed a frequency threshold value. In Step S120, at the same time when a data symbol is sent to a receiver by using a channel, a reference signal sent by the receiver is listened to and received on a same channel, which means that an execution body in the method in this embodiment has a capability of working in a CCFD mode, and sending and reception of data may take place in a same subframe; correspondingly, as the receiver, at the same time when the receiver receives data, the receiver may send data or a reference signal in an opposite direction of the same frequency.

During wireless data transmission, service data (for example, speech, a video, other data carried in the form of an IP packet), a signaling message that is between wireless devices, and the like usually need to be encoded and modulated first before they are transferred out in the manner of an electromagnetic wave. The encoding may comprise signal source encoding and channel encoding, and after channel encoding, processing such as interleaving may be further performed. The receiver obtains, by using processes such as corresponding de-interleaving (if any), decoding, and demodulation, data that is actually transmitted by a sender. In each transmission subframe, the sender device sends data to the receiver by using a data block (or may be referred to as a data unit, a data transmission block, and the like) as a unit. In the method in this embodiment, the data block is data obtained after channel encoding, or may be data that is obtained after channel encoding and interleaving. Each bit of the data after channel encoding and/or interleaving is referred to as a symbol, that is, the data symbol in the embodiments of the present application. Based on a different communications system, each data block may comprise multiple data symbols. For example, in an existing LTE network, one radio frame in a TDD mode comprises 10 subframes, each subframe comprises 2 timeslots, and each timeslot has 6 or 7 symbols.

A reference signal is usually from a data receiver, and is used by a device receiving the reference signal to perform channel estimation according to the reference signal. In an existing LTE TDD technology, there are a dedicated downlink reference signal and a dedicated uplink reference signal (DMRS and SRS), where one objective is to perform channel estimation. For example, the SRS signal of TDD is configured to be transmitted in one last symbol of a normal uplink subframe or to be transmitted according to a particular period in two symbols of an UpPTS. In a possible implementing manner, the method in this embodiment may map the reference signal to each data symbol. That is, for a sender and a receiver of wireless data transmission, at a moment when the sender sends each data symbol, the receiver may use a same channel to send a reference signal, so that in a process of transmitting a piece of data, quality of a radio channel at different moments is estimated according to reference signals at different moments, so that changes of the quality of the radio channel during an entire sending time can be determined more precisely.

In conclusion, the method in this embodiment can avoid delay and latency problems in estimation of channel quality because a reference signal and data are separately sent in different subframes, thereby improving the real-time performance and accuracy of estimating channel quality; moreover, the granularity of determining channel quality is within a same subframe or even each symbol, and in this way, in a process of transmitting a piece of data, quality of a radio channel at different moments may be estimated, so that changes of the quality of the radio channel during an entire sending time can be determined more precisely.

In a possible implementing manner, Step S140 may further comprise:

S142. Determine, at least according to the at least one reference signal, at least one channel quality parameter of the channel at the corresponding moment when the data symbol is sent to the receiver.

In the method in this embodiment, the foregoing channel quality parameter may be a parameter correlated to one or more parameters that can be used to measure channel quality. For example, the channel quality parameter may be correlated to one or more parameters of the following parameters: a signal-to-noise ratio (SNR), a carrier-to-noise ratio (CNR), a signal-to-interference-plus-noise ratio (SINR), a carrier-to-interference-plus-noise ratio (CINR), a bit error rate (BER), channel attenuation, a delay, channel state information (CSI), a channel transmission matrix, a channel quality indicator (CQI), and the like.

S144. Determine the quality of the channel at least according to the at least one channel quality parameter.

At least one channel quality parameter at the corresponding moment when the data symbol is sent to the receiver may be obtained according to the at least one reference signal, so that changes of the quality of the channel in an entire data sending process can be determined precisely. Any suitable channel quality parameter or channel quality parameters may be used to determine the quality of the channel, which is not limited in the method in this embodiment.

In addition, in a possible implementing manner, the method in this embodiment may further comprise:

S160. Determine, at least according to the quality of the channel, at least one data symbol that is to be retransmitted.

In a radio network, because of a factor such as interference that exists in a channel, an error may occur in data transmission. Retransmission is a mechanism in which a sender is enabled to resend data that encounters an error during transmission, to ensure that the receiver can correctly recover the data sent by the sender. In the method in this embodiment, because the quality of the channel may be determined by using the granularity of a symbol, which data symbols need to be retransmitted may be determined based on the quality of the channel at the corresponding moment of data symbols, instead of retransmitting an entire data block.

In a possible implementing manner, Step S160 may further comprise:

S162. In response to that the at least one channel quality parameter is less than a corresponding channel quality parameter threshold value, determine that the data symbol of the corresponding moment is to be retransmitted.

Figure 2A:
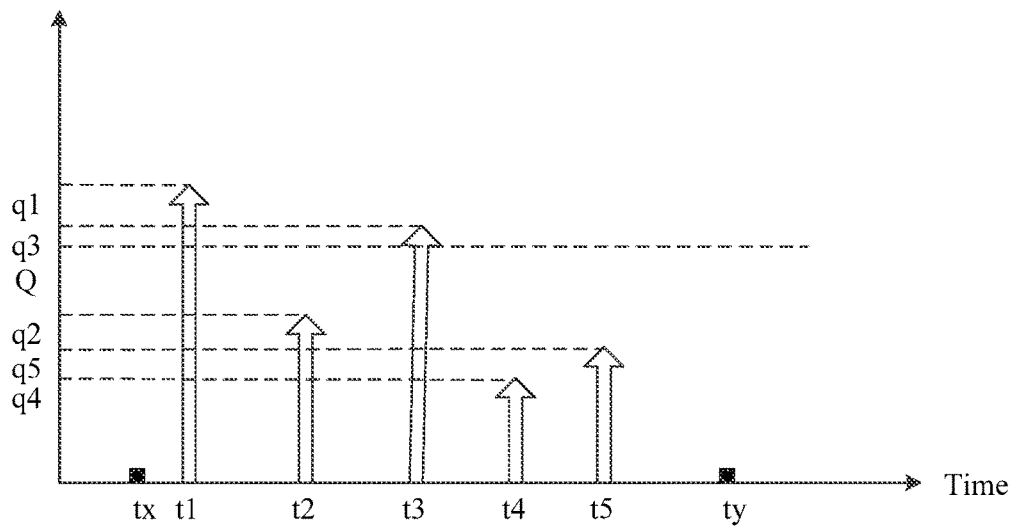
FIG. 2a is a schematic diagram of a relationship between time and a channel quality parameter that is obtained according to a reference signal in an application scenario of the present application.

One specific scenario is used as an example for description below. As shown in FIG. 2a, it is assumed that a moment tx to a moment ty is a time period during which the original data block is sent to the receiver in this embodiment of the present application, and the time period is usually one subframe. In the subframe, in one aspect, data is sent to the receiver, and in another aspect, 5 reference signals from the receiver are also received. Channel quality parameters q1, q2, q3, q4, and q5 at moments t1, t2, t3, t4, and t5 are obtained respectively through calculation according to the 5 reference signals. Exemplarily, q1, q2, q3, q4, and q5 may be respectively SNRs of the channel at the moments t1, t2, t3, t4, and t5; or q1, q2, q3, q4, and q5 may be respectively parameters correlated to the SNRs and BERs of the channel at the moments t1, t2, t3, t4, and t5; or q1, q2, q3, q4, and q5 may be respectively parameters correlated to other parameters used to measure channel quality at the moments t1, t2, t3, t4, and t5, which is not specifically limited in this embodiment of the present application. In this scenario, it is assumed that q2, q4, and q5 are all less than a channel quality parameter threshold value Q, and it may be determined accordingly that the quality of the channel deteriorates at the moments t2, t4, and t5. The receiver may probably fail to receive the symbols that are sent at these moments, or although the receiver receives the symbols, decoding has a slightly high error rate. Therefore, in this embodiment of the present application, it may be determined that the data symbols that are sent at the moments t2, t4, and t5 should be retransmitted.

In addition, a main objective of channel encoding, for example, error correction code and convolutional code, is to improve an anti-interference capability of a system. Generally, various modulation and coding schemes (MCS) may have a particular error correction capability, and allow a particular degree of transmission errors. That is, when the quality of the channel meets a particular condition, although the quality of the channel may deteriorate, the receiver still can recover data sent by a sender. In contrast, if the quality of the channel does not meet a particular condition, the receiver cannot recover the data sent by the sender, and needs to retransmit the data. In the method in this embodiment, Step S160 may further comprise:

S164. Determine, at least according to the at least one reference signal and a modulation and coding scheme that is used to send the data symbol to the receiver, at least one data symbol that is to be retransmitted.

Specifically, Step S164 may further comprise:

S1642. In response to that an accumulated time of moments during which the at least one channel quality parameter is less than a corresponding channel quality parameter threshold value reaches a time threshold value, determine at least one data symbol that is to be retransmitted.

In a possible implementing manner, the method in this embodiment may use a mapping relationship between a modulation and coding scheme and channel quality, where the mapping relationship may be, for example, as shown by the CQI mapping table in Table 7A in the 3GPP TS 25 214 V5.11.0, and is used to denote a modulation and coding scheme and channel quality required so that data can be correctly transmitted in the modulation and coding scheme. In Step S1642, the channel quality parameter threshold value is channel quality recorded in the mapping relationship, and the accumulated time of the moments and an accumulated quantity of data symbols are interchangeable for use; correspondingly, the time threshold value and the quantity threshold value are interchangeable for use.

Figure 2B:
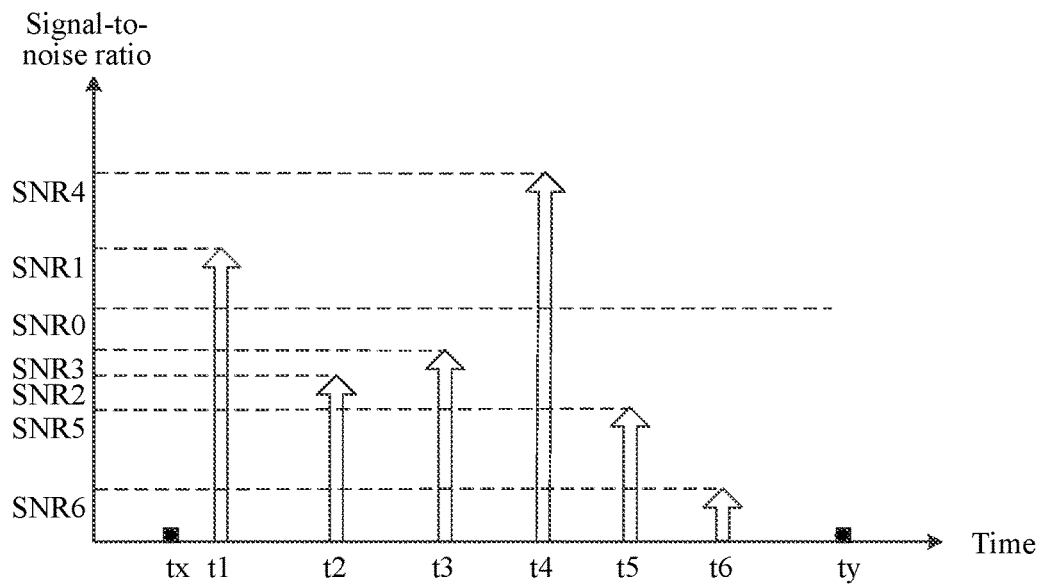
FIG. 2b is a schematic diagram of a relationship between time and a channel quality parameter that is obtained according to a reference signal in another application scenario of the present application.

In another application scenario, as shown in FIG. 2b, it is assumed that a moment tx to a moment ty is one subframe in which data is sent to the receiver in this embodiment. In the subframe, in an aspect, 6 data symbols are sent to the receiver respectively at moments t1, t2, t3, t4, t5, and t6, and in another aspect, 6 reference signals from the receiver are also received. SNRs SNR1, SNR2, SNR3, SNR4, SNR5, and SNR6 of the channel at the moments t1, t2, t3, t4, t5, and t6 are obtained respectively through calculation according to the 6 reference signals. According to the foregoing mapping relationship, an SNR corresponding to a modulation and coding scheme used in the subframe shown in FIG. 2b is SNR0. In this scenario, the SNRs of the channel that correspond to the four moments t2, t3, t5, and t6 are less than SNR0. It is assumed that when the accumulated quantity of data symbols that encounter an error does not exceed 3 (the quantity threshold value), retransmission is not needed, and a receive end can still correctly recover data transmitted in the subframe. However, in the scenario shown in FIG. 2b, the accumulated quantity of data symbols whose SNRs are less than SNR0 already exceeds 3, and therefore, it is determined that the receiver cannot recover, by using an error correction capability of the modulation and coding scheme, the data corresponding to the subframe, and the assistance of a retransmission mechanism is needed, to determine that the data symbols that correspond to the four moments t2, t3, t5, and t6 are to be retransmitted.

The time threshold value (quantity threshold value) may be set according to a specific modulation and coding scheme, for example, set according to the error correction capability of the modulation and coding scheme. Generally, a higher-order modulation and coding scheme has a higher requirement for the quality of the channel, and the time threshold value (quantity threshold value) should be set lower, so as to ensure correct data recovery of the receiver.

In conclusion, in the method in this embodiment, channel quality is determined according to a symbol level, and a sender can determine a data symbol that needs to be retransmitted. As compared with that a conventional receiver determines a data block that needs to be retransmitted, in the method in this embodiment, feedback from the receiver is not needed, thereby reducing a radio transmission delay, and because of retransmission of an incorrect symbol, a bandwidth waste that may be caused by retransmission of an entire data block is reduced.

In addition, because in the method in this embodiment, a sender determines a data symbol that is to be retransmitted, before being informed, a receiver does not know whether the sender has a retransmitted data symbol, and how the corresponding data symbol is to be retransmitted. In the method in this embodiment, the receiver may be informed of related information of a retransmitted data symbol by using a manner of a signaling message, to facilitate recovery of data by the receiver. In a possible implementing manner, the method in this embodiment further comprises:

S180. Send, to the receiver, indication information that is correlated to the at least one data symbol that is to be retransmitted.

The indication information may be any information correlated to at least one data symbol that is to be retransmitted, which comprises, but is not limited to: a quantity of data symbols to be retransmitted, and a position of a data symbol to be retransmitted in an original data block of the data symbol to be retransmitted.

In a possible implementing manner, in Step S180, the information correlated to the position of the at least one data symbol, which is to be retransmitted, in the original data block may be sent to the receiver by using a signaling message.

In another possible implementing manner, in Step S180, the information correlated to the position of the at least one data symbol, which is to be retransmitted, in the original data block and the at least one data symbol that is to be retransmitted may be added to a next data block to be sent to the receiver, and the next data block is sent.

In still another possible implementing manner, the sender may also avoid informing the receiver of any information correlated to a retransmitted data symbol. A piggyback manner may be used. That is, after a retransmitted symbol that is attached to a newly sent data block (which is distinguished from the original data block, and may be a data block sent in a subframe after the original data block is sent), a new data unit is formed. If new data to be sent does not exist, this data unit may be completely formed of retransmitted data symbols. The receiver determines, by using a manner such as blind detection, whether a retransmitted data symbol exists and determines the retransmitted data symbol.

In conclusion, the method in this embodiment avoids delay and latency problems in estimation of channel quality, so that the real-time performance and accuracy of estimating channel quality can be improved, and a data symbol that encounters an error is retransmitted, so that a bandwidth waste can be reduced, and a radio transmission delay can be further reduced.

Figure 3:
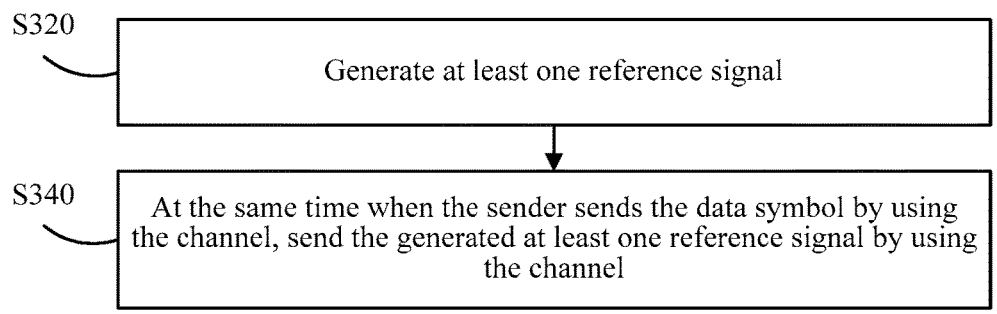
FIG. 3 is a flowchart of an example of an auxiliary method for determining channel quality according to an embodiment of the present application.

FIG. 3 is a flowchart of an example of an auxiliary method for determining channel quality according to an embodiment of the present application. As shown in FIG. 3, the method may comprise:

S320. Generate at least one reference signal, where the at least one reference signal is used for a sender to determine, at least according to the at least one reference signal, quality of a channel at a corresponding moment when a data symbol is sent to a receiver.

S340. At the same time when the sender sends the data symbol by using the channel, send the generated at least one reference signal by using the channel.

A reference signal is usually from a data receiver, and is used by a device receiving the reference signal to perform channel estimation according to the reference signal. In an existing LTE TDD technology, there are a dedicated downlink reference signal and a dedicated uplink reference signal (DMRS and SRS), where one objective is to perform channel estimation. For example, the SRS signal of TDD is configured to be transmitted in one last symbol of a normal uplink subframe or to be transmitted according to a particular period in two symbols of an UpPTS. In a possible implementing manner, the method in this embodiment may map the reference signal to each data symbol. That is, for a sender and a receiver of wireless data transmission, at a moment when the sender sends each data symbol, the receiver may use a same channel to send a reference signal, so that in a process of transmitting a piece of data, quality of a radio channel at different moments is estimated according to reference signals at different moments, so that changes of the quality of the radio channel during an entire sending time can be determined more precisely.

In conclusion, the method in this embodiment can avoid delay and latency problems in estimation of channel quality because a reference signal and data are separately sent in different subframes, thereby improving the real-time performance and accuracy of estimating channel quality, so that channel quality is determined by using the granularity of a same subframe or even each symbol; in this way, in a process of transmitting a piece of data, quality of a radio channel at different moments is estimated, thereby determining changes of the quality of the radio channel during an entire sending time more precisely.

Optionally, in the method in this embodiment, a payload part of the foregoing reference signal may be empty. Optionally, a packet header part of the foregoing reference signal may be the same as a packet header part of the data.

Still as described in FIG. 1, a sender device may determine, according to the quality of the channel, a data symbol that is to be retransmitted, and implements retransmission. In such an implementing manner, the method in this embodiment may further comprise:

S360. Determine at least one data symbol that is retransmitted by the sender.

S380. Decode, at least according to the retransmitted at least one data symbol, data sent by the sender.

The data sent by the sender is content of a data block (or data unit) sent by the sender within a period of time (for example, one subframe).

The sender may inform, by using indication information, the receiver of information correlated to the retransmitted data symbol. In such an implementing manner, Step S360 may further comprise:

S362. Acquire indication information correlated to the retransmitted at least one data symbol.

S364. Determine the retransmitted at least one data symbol at least according to the indication information.

Still as described in FIG. 1, the indication information may be information correlated to a position of the at least one data symbol, which is retransmitted by the sender, in an original data block of the at least one data symbol, and the sender sends the indication information in the form of a signaling message. In Step S362, the indication information may be acquired by receiving such signaling message. Therefore, in Step S364, the retransmitted at least one data symbol is determined according to the indication information.

In another possible implementing manner, the sender may add, to data in a next subframe sent to the receiver, the information correlated to a position of the retransmitted at least one data symbol in an original data block, and the at least one data symbol that is to be retransmitted, and send the data. In such an implementing manner, in Step S362, the information correlated to a position of the retransmitted at least one data symbol in an original data block and the retransmitted at least one data symbol may be acquired at least according to a data block from the sender. In such an implementing manner, the sender and the receiver may simply define the structure of a newly sent data block that comprises the retransmitted data symbol, for example: position 1+symbol 1|position 2+symbol 2|position 3+symbol 3|position 4+symbol 4| . . . |position n+symbol n. The position 1, the position 2, . . . , and the position n represent positions of retransmitted symbols in the original data block. The symbol 1, the symbol 2, . . . , and the symbol n represent content of the retransmitted symbols. Optionally, each piece of position information and content of a corresponding retransmitted symbol are separately represented by one or more symbols. Alternatively, another structure may be used. For example, multiple pieces of position information are represented in a same symbol. For example, each symbol of 16-QAM may represent 4-bit data. If the position information of the retransmitted symbol is within 15, the position information can be represented by using one symbol. In an LTE TDD mode, one subframe comprises 12 or 14 symbols. Therefore, one symbol is sufficient to represent the position information of the retransmitted symbol. For 32QAM, 64QAM, 128QAM, and the like, one symbol may be used to represent more information, and may be used to represent positions of multiple symbols. For a data format of a retransmitted symbol, there may further be other manners. However, in the embodiments of the present application, because the sender detects whether retransmission is needed, a retransmitted symbol and a position of the retransmitted symbol in an original data block need to be carried during retransmission.

In still another possible implementing manner, the sender does not inform the receiver of any information correlated to the retransmitted data symbol, and directly retransmits the data symbol that needs to be retransmitted. In such an implementing manner, the sender and the receiver may predefine multiple formats of a data unit. For example, a data unit=a new data block+a new data block formed of n retransmitted symbols (n=0, 1, 2, . . . , and M), where M is a maximum quantity of retransmitted symbols that is allowed in one time of retransmission. Because the sender does not inform the receiver of any information correlated to a retransmitted symbol, the receiver cannot know the value of n, and cannot know the length and format of a newly sent data block either. However, because the value of n is one of (M+1) values, the receiver may change the value of n one by one, and attempts to decode the newly sent data block. If the data block is decoded correctly, it is considered that the current time of attempt succeeds, and the value of n may be determined. After n is determined, the position of the retransmitted symbol in the original data block of the retransmitted symbol and the content of the retransmitted symbol may be determined subsequently.

In Step S380, the receiver may combine symbols that are received successively and are at a same position in a same data block, and perform joint decoding after combination. In a possible implementing manner, an original symbol may be directly discarded, and a retransmitted symbol is demodulated, to obtain bit content represented by the symbol. In another implementing manner, weighted averaging may be further performed on two successive symbols, and symbols obtained after weighted averaging is then demodulated, to obtain bit content represented by these symbols.

It should be understood that in various embodiments of the present application, the value of the serial number of each step described above does not mean an execution sequence, and the execution sequence of each step should be determined according to the function and internal logic thereof, and should not be any limitation on the implementation procedure of the specific implementations of the present application.

In addition, an embodiment of the present application further provides a computer readable medium, which comprises a computer readable instruction that performs, when being executed, the following operations: performing operations of the steps in the method in the implementation shown in FIG. 1 above.

In addition, an embodiment of the present application further provides a computer readable medium, which comprises a computer readable instruction that performs, when being executed, the following operations: performing operations of the steps in the method in the implementation shown in FIG. 3 above.

Figure 4A:
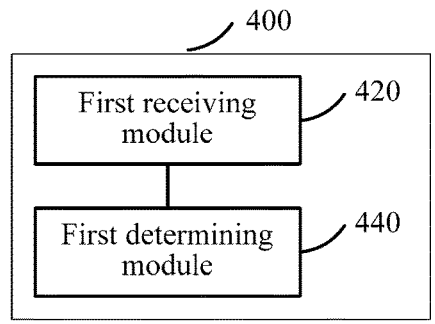
FIG. 4a to FIG. 4f are structural block diagrams of multiple examples of an apparatus for determining channel quality according to an embodiment of the present application.

FIG. 4a is a structural block diagram of an example of an apparatus for determining channel quality according to a first embodiment of the present application. As shown in FIG. 4a, the apparatus 400 comprises:

A first receiving module 420 is configured to: at the same time when a data symbol is sent to a receiver by using a channel, receive at least one reference signal by using the channel.

A first determining module 440 is configured to determine, at least according to the at least one reference signal, quality of the channel at a corresponding moment when the data symbol is sent to the receiver.

The apparatus of this embodiment may be a device in a CCFD mode in a TDD system, for example, a sender device in a process of wireless data transmission. Such a sender device may comprise a base station and any wireless terminal device. The base station may comprise, may be implemented as, or may be referred to as a node B, an eNode B, an RNC, a BSC, a BTS, a BS, a TF, a wireless router, a wireless transceiver, a BSS, an ESS, an RBS, or some other terms. The wireless terminal device may comprise, may be implemented as, or may be referred to as a user station, a user unit, a mobile station, a remote station, a remote terminal, a user terminal, a user agent, a user apparatus, user equipment, a user station, or some other terms. Such a terminal device may comprise a cellular telephone, an SIP telephone, a WLL station, a PDA, a handheld device having a wireless connection capability, a STA, or another possible wireless device that can perform wireless data transmission.

In the apparatus of this embodiment, the channel may also be distinguished by using frequency (or may be referred to as a frequency channel). Same channels mean channels having same frequency or close frequency. The "close" means that a frequency deviation does not exceed a frequency threshold value. At the same time when a data symbol is sent to a receiver by using a channel, the first receiving module 420 may listen to and receive a reference signal sent by the receiver on a same channel, which means that the apparatus in this embodiment has a capability of working in a CCFD mode, and sending and reception of data may take place in a same subframe; correspondingly, as the receiver, at the same time when the receiver receives data, the receiver may send data or a reference signal in an opposite direction of the same frequency.

During wireless data transmission, service data (for example, speech, a video, other data carried in the form of an IP packet), a signaling message that is between wireless devices, and the like usually need to be encoded and modulated first before they are transferred out in the manner of an electromagnetic wave. The encoding may comprise signal source encoding and channel encoding, and after channel encoding, processing such as interleaving may be further performed. The receiver obtains, by using processes such as corresponding de-interleaving (if any), decoding, and demodulation, data that is actually transmitted by a sender. In each transmission subframe, the sender device sends data to the receiver by using a data block (or may be referred to as a data unit, a data transmission block, and the like) as a unit. In the apparatus of this embodiment, the data block is data obtained after channel encoding, or may be data that is obtained after channel encoding and interleaving. Each bit of the data after channel encoding and/or interleaving is referred to as a symbol, that is, the data symbol in the embodiments of the present application. Based on a different communications system, each data block may comprise multiple data symbols. For example, in an existing LTE network, one radio frame in a TDD mode comprises 10 subframes, each subframe comprises 2 timeslots, and each timeslot has 6 or 7 symbols.

A reference signal is usually from a data receiver, and is used by a device receiving the reference signal to perform channel estimation according to the reference signal. In an existing LTE TDD technology, there are a dedicated downlink reference signal and a dedicated uplink reference signal (DMRS and SRS), where one objective is to perform channel estimation. For example, the SRS signal of TDD is configured to be transmitted in one last symbol of a normal uplink subframe or to be transmitted according to a particular period in two symbols of an UpPTS. In a possible implementing manner, the apparatus of this embodiment may map the reference signal to each data symbol. That is, for a sender and a receiver of wireless data transmission, at a moment when the sender sends each data symbol, the receiver may use a same channel to send a reference signal, so that in a process of transmitting a piece of data, quality of a radio channel at different moments is estimated according to reference signals at different moments, so that changes of the quality of the radio channel during an entire sending time can be determined more precisely.

In conclusion, the apparatus of this embodiment can avoid delay and latency problems in estimation of channel quality because a reference signal and data are separately sent in different subframes, thereby improving the real-time performance and accuracy of estimating channel quality; moreover, the granularity of determining channel quality is within a same subframe or even each symbol, and in this way, in a process of transmitting a piece of data, quality of a radio channel at different moments may be estimated, so that changes of the quality of the radio channel during an entire sending time can be determined more precisely.

Figure 4B:
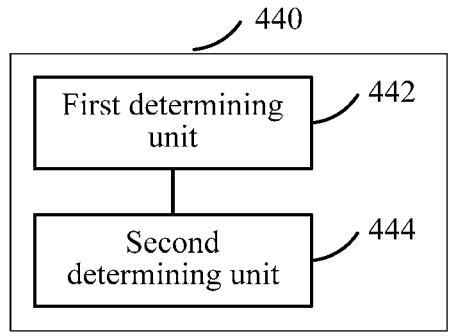

In a possible implementing manner, as shown in FIG. 4b, the first determining module 440 may further comprise:

A first determining unit 442 is configured to determine, at least according to the at least one reference signal, at least one channel quality parameter of the channel at the corresponding moment when the data symbol is sent to the receiver.

In the apparatus of this embodiment, the foregoing channel quality parameter may be a parameter correlated to one or more parameters that can be used to measure channel quality. For example, the channel quality parameter may be correlated to one or more parameters of the following parameters: an SNR, a CNR, an SINR, a CINR, a BER, channel attenuation, a delay, CSI, a channel transmission matrix, a CQI, and the like.

A second determining unit 444 is configured to determine the quality of the channel at least according to the at least one channel quality parameter.

At least one channel quality parameter at the corresponding moment when the data symbol is sent to the receiver may be obtained according to the at least one reference signal, so that changes of the quality of the channel in an entire data sending process can be determined precisely. Any suitable channel quality parameter or channel quality parameters may be used to determine the quality of the channel, which does not constitute any limitation on the apparatus in this embodiment.

Figure 4C:
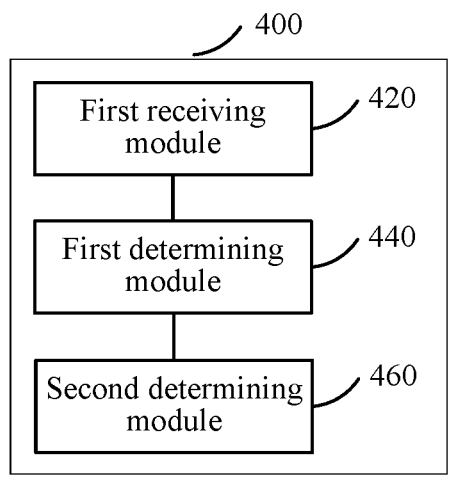

In addition, in a possible implementing manner, as shown in FIG. 4c, the apparatus of this embodiment may further comprise:

A second determining module 460 is configured to determine, at least according to the quality of the channel, at least one data symbol that is to be retransmitted.

In a radio network, because of a factor such as interference that exists in a channel, an error may occur in data transmission. Retransmission is a mechanism in which a sender is enabled to resend data that encounters an error during transmission, to ensure that the receiver can correctly recover the data sent by the sender. In the apparatus of this embodiment, because the quality of the channel may be determined by using the granularity of a symbol, which data symbols need to be retransmitted may be determined based on the quality of the channel at the corresponding moment of data symbols, instead of retransmitting an entire data block.

Figure 4D:
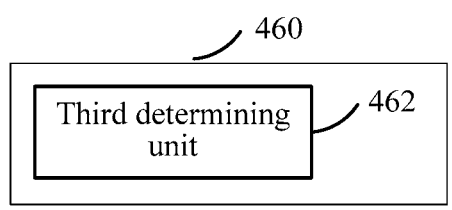

In a possible implementing manner, as shown in FIG. 4d, the second determining module 460 may further comprise:

A third determining unit 462 is configured to: in response to that the at least one channel quality parameter is less than a corresponding channel quality parameter threshold value, determine that the data symbol of the corresponding moment is to be retransmitted.

One specific scenario is used as an example for description below. As shown in FIG. 2a, it is assumed that a moment tx to a moment ty is a time period during which the original data block is sent to the receiver in this embodiment of the present application, and the time period is usually one subframe. In the subframe, in one aspect, data is sent to the receiver, and in another aspect, 5 reference signals from the receiver are also received. Channel quality parameters q1, q2, q3, q4, and q5 at moments t1, t2, t3, t4, and t5 are obtained respectively through calculation according to the 5 reference signals. Exemplarily, q1, q2, q3, q4, and q5 may be respectively SNRs of the channel at the moments t1, t2, t3, t4, and t5; or q1, q2, q3, q4, and q5 may be respectively parameters correlated to the SNRs and BERs of the channel at the moments t1, t2, t3, t4, and t5; or q1, q2, q3, q4, and q5 may be respectively parameters correlated to other parameters used to measure channel quality at the moments t1, t2, t3, t4, and t5, which is not specifically limited in this embodiment of the present application. In this scenario, it is assumed that q2, q4, and q5 are all less than a channel quality parameter threshold value Q, and it may be determined accordingly that the quality of the channel deteriorates at the moments t2, t4, and t5. The receiver may probably fail to receive the symbols that are sent at these moments, or although the receiver receives the symbols, decoding has a slightly high error rate. Therefore, the third determining unit 462 may determine that the data symbols that are sent at the moments t2, t4, and t5 should be retransmitted.

In addition, a main objective of channel encoding, for example, error correction code and convolutional code, is to improve an anti-interference capability of a system. Generally, various modulation and coding schemes (MCS) may have a particular error correction capability, and allow a particular degree of transmission errors. That is, when the quality of the channel meets a particular condition, although the quality of the channel may deteriorate, the receiver still can recover data sent by a sender. In contrast, if the quality of the channel does not meet a particular condition, the receiver cannot recover the data sent by the sender, and needs to retransmit the data. In the apparatus of this embodiment, the second determining module 460 may be configured to determine, at least according to the at least one reference signal and a modulation and coding scheme that is used to send the data symbol to the receiver, at least one data symbol that is to be retransmitted.

Figure 4E:
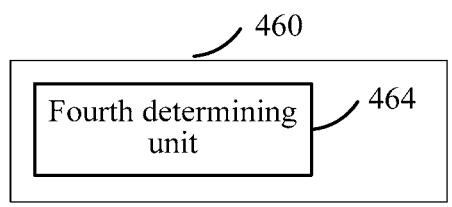

Specifically, as shown in FIG. 4e, the second determining module 460 may further comprise:

A fourth determining unit 464 is configured to: in response to that an accumulated time of moments during which the at least one channel quality parameter is less than a corresponding channel quality parameter threshold value reaches a time threshold value, determine at least one data symbol that is to be retransmitted.

In a possible implementing manner, the apparatus of this embodiment may use a mapping relationship between a modulation and coding scheme and channel quality, where the mapping relationship may be, for example, as shown by the CQI mapping table in Table 7A in the 3GPP TS 25 214 V5.11.0, and is used to denote a modulation and coding scheme and channel quality required so that data can be correctly transmitted in the modulation and coding scheme. The channel quality parameter threshold value is channel quality recorded in the mapping relationship, and the accumulated time of the moments and an accumulated quantity of data symbols are interchangeable for use; correspondingly, the time threshold value and the quantity threshold value are interchangeable for use.

In another application scenario, as shown in FIG. 2b, it is assumed that a moment tx to a moment ty is one subframe in which data is sent to the receiver in this embodiment. In the subframe, in an aspect, 6 data symbols are sent to the receiver respectively at moments t1, t2, t3, t4, t5, and t6, and in another aspect, 6 reference signals from the receiver are also received. SNRs SNR1, SNR2, SNR3, SNR4, SNR5, and SNR6 of the channel at the moments t1, t2, t3, t4, t5, and t6 are obtained respectively through calculation according to the 6 reference signals. According to the foregoing mapping relationship, an SNR corresponding to a modulation and coding scheme used in the subframe shown in FIG. 2b is SNR0. In this scenario, the SNRs of the channel that correspond to the four moments t2, t3, t5, and t6 are less than SNR0. It is assumed that when the accumulated quantity of data symbols that encounter an error does not exceed 3 (the quantity threshold value), retransmission is not needed, and a receive end can still correctly recover data transmitted in the subframe. However, in the scenario shown in FIG. 2b, the accumulated quantity of data symbols whose SNRs are less than SNR0 already exceeds 3, and therefore, it is determined that the receiver cannot recover, by using an error correction capability of the modulation and coding scheme, the data corresponding to the subframe, and the assistance of a retransmission mechanism is needed, to determine that the data symbols that correspond to the four moments t2, t3, t5, and t6 are to be retransmitted.

The time threshold value (quantity threshold value) may be set according to a specific modulation and coding scheme, for example, set according to the error correction capability of the modulation and coding scheme. Generally, a higher-order modulation and coding scheme has a higher requirement for the quality of the channel, and the time threshold value (quantity threshold value) should be set lower, so as to ensure correct data recovery of the receiver.

In conclusion, in the apparatus of this embodiment, channel quality is determined according to a symbol level, and a sender can determine a data symbol that needs to be retransmitted. As compared with that a conventional receive end determines a data block that needs to be retransmitted, for the apparatus of this embodiment, feedback from the receiver is not needed, thereby reducing a radio transmission delay, and because of retransmission of an incorrect symbol, a bandwidth waste that may be caused by retransmission of an entire data block is reduced.

Figure 4F:
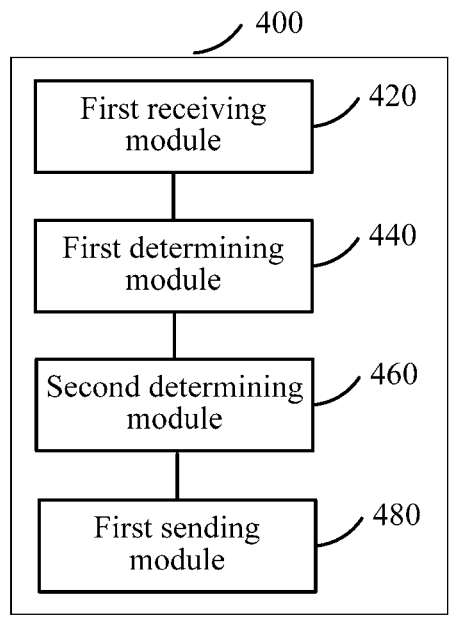

In addition, because the apparatus of this embodiment is a sender device, and the apparatus of this embodiment determines a data symbol that is to be retransmitted, before being informed, a receiver does not know whether a sender has a retransmitted data symbol, and how the corresponding data symbol is to be retransmitted. The apparatus of this embodiment may inform the receiver of related information of a retransmitted data symbol by using a manner of a signaling message, to facilitate recovery of data by the receiver. In a possible implementing manner, as shown in FIG. 4f, the apparatus of this embodiment further comprises:

A first sending module 480 is configured to send, to the receiver, indication information that is correlated to the at least one data symbol that is to be retransmitted.

The indication information may be any information correlated to at least one data symbol that is to be retransmitted, which comprises, but is not limited to: a quantity of data symbols to be retransmitted, a position of a data symbol to be retransmitted in an original data block of the data symbol to be retransmitted, and the like.

In a possible implementing manner, the first sending module 480 may send, to the receiver by using a signaling message, the information correlated to the position of the at least one data symbol, which is to be retransmitted, in the original data block.

In another possible implementing manner, the first sending module 480 may add, to a next data block to be sent to the receiver, the information correlated to the position of the at least one data symbol, which is to be retransmitted, in the original data block and the at least one data symbol that is to be retransmitted, and send the next data block.

In still another possible implementing manner, the sender may also avoid informing the receiver of any information correlated to a retransmitted data symbol. A piggyback manner may be used. That is, after a retransmitted symbol that is attached to a newly sent data block (which is distinguished from the original data block, and may be a data block sent in a subframe after the original data block is sent), a new data unit is formed. If new data to be sent does not exist, this data unit may be completely formed of retransmitted data symbols. The receiver determines, by using a manner such as blind detection, whether a retransmitted data symbol exists and determines the retransmitted data symbol.

In conclusion, the apparatus of this embodiment avoids delay and latency problems in estimation of channel quality, so that the real-time performance and accuracy of estimating channel quality can be improved, and a data symbol that encounters an error is retransmitted, so that a bandwidth waste can be reduced, and a radio transmission delay can be further reduced.

Figure 5A:
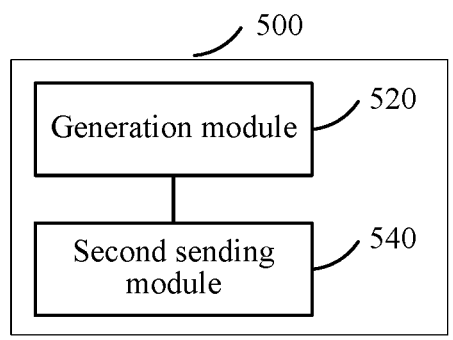
FIG. 5a to FIG. 5c are structural block diagrams of multiple examples of an auxiliary apparatus for determining channel quality according to an embodiment of the present application.

FIG. 5*a* is a structural block diagram of an example of an auxiliary apparatus for determining channel quality according to an embodiment of the present application. As shown in FIG. 5*a*, the apparatus 500 comprises:

A generation module 520 is configured to generate at least one reference signal, where the at least one reference signal is used for a sender to determine, at least according to the at least one reference signal, quality of a channel at a corresponding moment when a data symbol is sent to a receiver.

A second sending module 540 is configured to: at the same time when the sender sends the data symbol by using the channel, send the generated at least one reference signal by using the channel.

A reference signal is usually from a data receiver, and is used by a device receiving the reference signal to perform channel estimation according to the reference signal. In an existing LTE TDD technology, there are a dedicated downlink reference signal and a dedicated uplink reference signal (DMRS and SRS), where one objective is to perform channel estimation. For example, the SRS signal of TDD is configured to be transmitted in one last symbol of a normal uplink subframe or to be transmitted according to a particular period in two symbols of an UpPTS. In a possible implementing manner, the apparatus of this embodiment may map the reference signal to each data symbol. That is, for a sender and a receiver of wireless data transmission, at a moment when the sender sends each data symbol, the receiver may use a same channel to send a reference signal, so that in a process of transmitting a piece of data, quality of a radio channel at different moments is estimated according to reference signals at different moments, so that changes of the quality of the radio channel during an entire sending time can be determined more precisely.

In conclusion, the apparatus of this embodiment can avoid delay and latency problems in estimation of channel quality because a reference signal and data are separately sent in different subframes, thereby improving the real-time performance and accuracy of estimating channel quality, so that channel quality is determined by using the granularity of a same subframe or even each symbol; in this way, in a process of transmitting a piece of data, quality of a radio channel at different moments is estimated, thereby determining changes of the quality of the radio channel during an entire sending time more precisely.

Optionally, in the apparatus of this embodiment, a payload part of the foregoing reference signal may be empty. Optionally, a packet header part of the foregoing reference signal may be the same as a packet header part of the data.

Figure 5B:
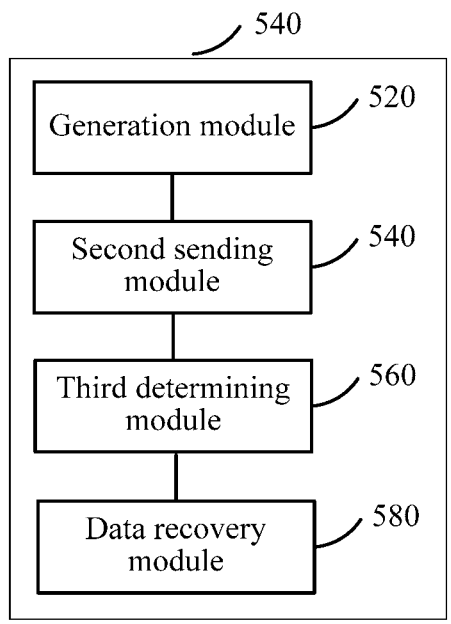

Still as described in FIG. 1, a sender device may determine, according to the quality of the channel, a data symbol that is to be retransmitted, and implements retransmission. In such an implementing manner, as shown in FIG. 5*b*, the apparatus of this embodiment may further comprise:

A third determining module 560 is configured to determine at least one data symbol that is retransmitted by the sender.

A data recovery module 580 recovers, at least according to the retransmitted at least one data symbol, data sent by the sender.

The data sent by the sender is content of a data block (or data unit) sent by the sender within a period of time (for example, one subframe).

Figure 5C:
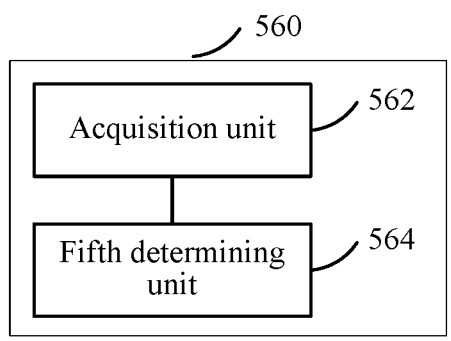

The sender may inform, by using indication information, the receiver of information correlated to the retransmitted data symbol, in such an implementing manner, as shown in FIG. 5*c*, the third determining module 560 may further comprise:

An acquisition unit 562 is configured to acquire indication information correlated to the retransmitted at least one data symbol.

A fifth determining unit 564 is configured to determine the retransmitted at least one data symbol at least according to the indication information.

Still as described in FIG. 1, the indication information may be information correlated to a position of the at least one data symbol, which is retransmitted by the sender, in an original data block of the at least one data symbol, and the sender sends the indication information in the form of a signaling message. The acquisition unit 562 may acquire the indication information by receiving such signaling message. Therefore, the fifth determining unit 564 determines the retransmitted at least one data symbol according to the indication information.

In another possible implementing manner, the sender may add, to data in a next subframe sent to the receiver, the information correlated to a position of the retransmitted at least one data symbol in an original data block, and the at least one data symbol that is to be retransmitted, and send the data. In such an implementing manner, the acquisition unit 562 may acquire, at least according to a data block from the sender, information correlated to a position of the retransmitted at least one data symbol in an original data block, and the retransmitted at least one data symbol. In such an implementing manner, the sender and the receiver may simply define the structure of a newly sent data block that comprises the retransmitted data symbol, for example: position 1+symbol 1|position 2+symbol 2|position 3+symbol 3|position 4+symbol 4| . . . |position n+symbol n. The position 1, the position 2, . . . , and the position n represent positions of retransmitted symbols in the original data block. The symbol 1, the symbol 2, . . . , and the symbol n represent content of the retransmitted symbols. Optionally, each piece of position information and content of a corresponding retransmitted symbol are separately represented by one or more symbols. Alternatively, another structure may be used. For example, multiple pieces of position information are represented in a same symbol. For example, each symbol of 16-QAM may represent 4-bit data. If the position information of the retransmitted symbol is within 15, the position information can be represented by using one symbol. In an LTE TDD mode, one subframe comprises 12 or 14 symbols. Therefore, one symbol is sufficient to represent the position information of the retransmitted symbol. For 32QAM, 64QAM, 128QAM, and the like, one symbol may be used to represent more information, and may be used to represent positions of multiple symbols. For a data format of a retransmitted symbol, there may further be other manners. However, in the embodiments of the present application, because the sender detects whether retransmission is needed, a retransmitted symbol and a position of the retransmitted symbol in an original data block need to be carried during retransmission.

In still another possible implementing manner, the sender does not inform the receiver of any information correlated to the retransmitted data symbol, and directly retransmits the data symbol that needs to be retransmitted. In such an implementing manner, the sender and the receiver may predefine multiple formats of a data unit. For example, a data unit=a new data block+a new data block formed of n retransmitted symbols (n=0, 1, 2, . . . , and M), where M is a maximum quantity of retransmitted symbols that is allowed in one time of retransmission. Because the sender does not inform the receiver of any information correlated to a retransmitted symbol, the receiver cannot know the value of n, and cannot know the length and format of a newly sent data block either. However, because the value of n is one of (M+1) values, the receiver may change the value of n one by one, and attempts to decode the newly sent data block. If the data block is decoded correctly, it is considered that the current time of attempt succeeds, and the value of n may be determined. After n is determined, the position of the retransmitted symbol in the original data block of the retransmitted symbol and the content of the retransmitted symbol may be determined subsequently.

The data recovery module 580 may combine symbols that are received successively and are at a same position in a same data block, and perform joint decoding after combination. In a possible implementing manner, an original symbol may be directly discarded, and a retransmitted symbol is demodulated, to obtain bit content represented by the symbol. In another implementing manner, weighted averaging may be further performed on two successive symbols, and symbols obtained after weighted averaging is then demodulated, to obtain bit content represented by these symbols.

Figure 6:
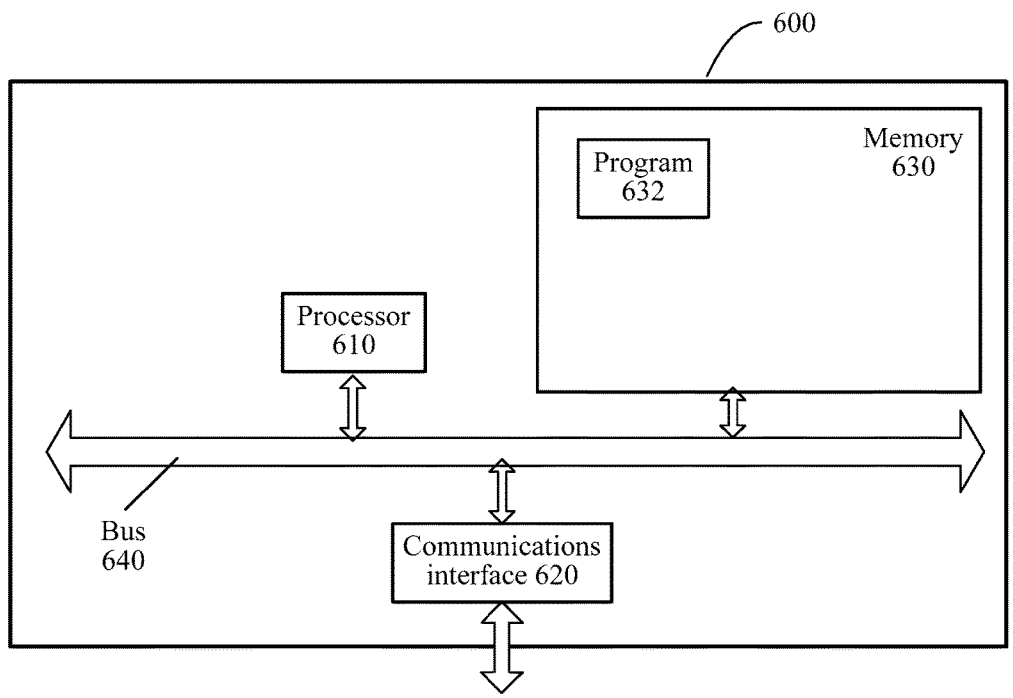
FIG. 6 is a structural block diagram of still another example of an apparatus for determining channel quality according to an embodiment of the present application.

FIG. 6 is a schematic structural diagram of another example of an apparatus for determining channel quality according to a first embodiment of the present application. The specific embodiments of the present application are not intended to limit the specific implementation of the apparatus for determining channel quality. As shown in FIG. 6, the apparatus 600 for determining channel quality may comprise:

a processor 610, a communications interface 620, a memory 630, and a communications bus 640.

The processor 610, the communications interface 620, and the memory 630 communicate with each other by using the communications bus 640.

The communications interface 620 is configured to communicate with a network element such as a client.

The processor 610 is configured to execute a program 632. Specifically, the processor 710 can perform relevant steps in the foregoing method embodiment.

Specifically, the program 632 may comprise program code, where the program code comprises a computer operation instruction.

The processor 610 may be a central processing unit (CPU), an application specific integrated circuit (ASIC), or one or more integrated circuits configured to implement the embodiments of the present application.

The memory 630 is configured to store the program 632. The memory 630 may comprise a high-speed random access memory (RAM) memory, and may also comprise a non-volatile memory such as at least one magnetic disk storage. The program 632 can be specifically used to cause the apparatus 600 for determining channel quality to perform the following steps:

receiving information correlated to calling of at least one standby device, where the information correlated to calling of the at least one standby device is used to request to wake up the at least one standby device from a sleep state to an active state; and sending an excitation signal to the at least one standby device, where the excitation signal is used to wake up the at least one standby device.

For the specific implementation of the steps in the program 632, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 7:
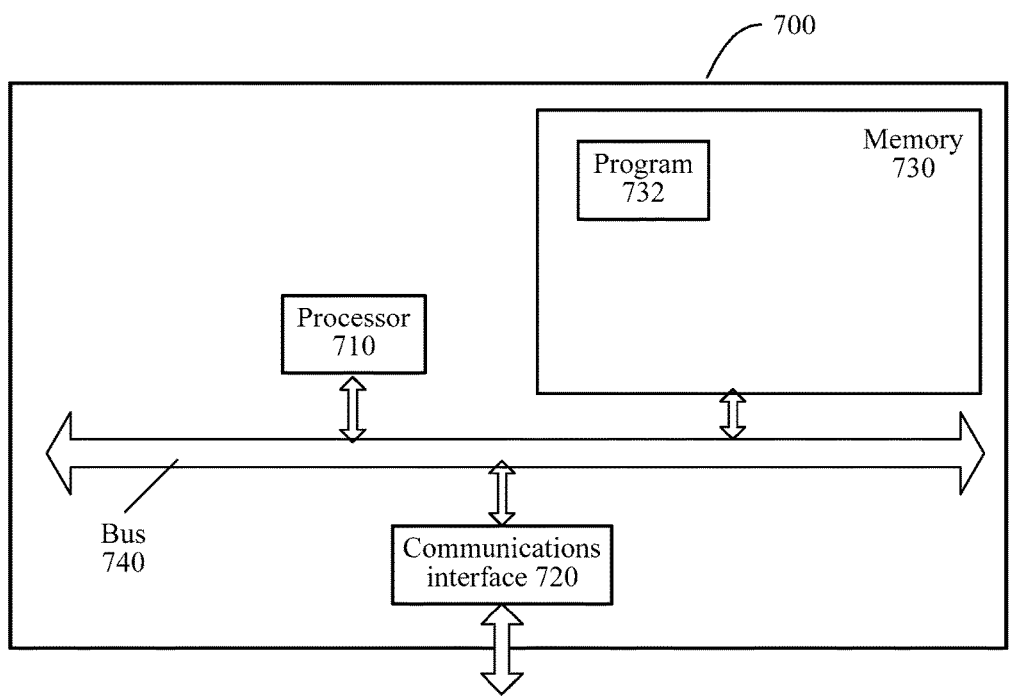
FIG. 7 is a structural block diagram of still another example of an auxiliary apparatus for determining channel quality according to an embodiment of the present application.

FIG. 7 is a schematic structural diagram of another example of an auxiliary apparatus for determining channel quality according to an embodiment of the present application. Specific embodiments of the present application are not intended to limit the specific implementation of the auxiliary apparatus for determining channel quality. As shown in FIG. 7, the auxiliary apparatus 700 for determining channel quality may comprise:

a processor 710, a communications interface 720, a memory 730, and a communications bus 740.

The processor 710, the communications interface 720, and the memory 730 communicate with each other by using the communications bus 740.

The communications interface 720 is configured to communicate with a network element such as a client.

The processor 710 is configured to execute a program 732, and specifically can implement relevant steps in the foregoing method embodiments.

Specifically, the program 732 may comprise program code, where the program code comprises a computer operation instruction.

The processor 710 may be a central processing unit (CPU), or an application specific integrated circuit (ASIC), or may be configured as one or more integrated circuits that implement the embodiments of the present application.

The memory 730 is configured to store the program 732. The memory 730 may comprise a high speed random access memory (RAM), and may also comprise a non-volatile memory such as at least one magnetic disk storage. The program 732 may be specifically used to cause the auxiliary apparatus 700 for determining channel quality to execute the following steps:

receiving information correlated to calling of at least one standby device, where the information correlated to calling of the at least one standby device is used to request to wake up the at least one standby device from a sleep state to an active state; and sending an excitation signal to the at least one standby device, where the excitation signal is used to wake up the at least one standby device.

For the specific implementation of the steps in the program 732, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the corresponding description in the foregoing apparatus embodiments for detailed working procedures of the foregoing devices and modules, and details are not described herein again.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The foregoing implementations are only used to describe the present invention, but not to limit the present invention. A person of ordinary skill in the art can still make various alterations and modifications without departing from the spirit and scope of the present invention; therefore, all equivalent technical solutions also fall within the scope of the present invention, and the patent protection scope of the present invention should be subject to the claims.

What is claimed is:

1. A method for determining channel quality, the method comprising:
   at the same time when a data symbol is sent to a receiver by using a channel, receiving at least one reference signal by using the channel; and
   determining, at least according to the at least one reference signal, quality of the channel at a corresponding moment when the data symbol is sent to the receiver.

2. The method of claim 1, wherein the determining quality of the channel comprises:
   determining, at least according to the at least one reference signal, at least one channel quality parameter of the channel at the corresponding moment when the data symbol is sent to the receiver; and
   determining the quality of the channel at least according to the at least one channel quality parameter.

3. The method of claim 2, the method further comprising:
   determining, at least according to the quality of the channel, at least one data symbol that is to be retransmitted.

4. The method of claim 3, wherein the determining at least one data symbol that is to be retransmitted comprises:
   in response to that the at least one channel quality parameter is less than a corresponding channel quality parameter threshold value, determining that the data symbol of the corresponding moment is to be retransmitted.

5. The method of claim 3, wherein the determining at least one data symbol that is to be retransmitted further comprises:
   determining, at least according to the at least one reference signal and a modulation and coding scheme that is used to send the data symbol to the receiver, the at least one data symbol that is to be retransmitted.

6. The method of claim 5, wherein the determining at least one data symbol that is to be retransmitted comprises:
   in response to that an accumulated time of moments during which the at least one channel quality parameter is less than a corresponding channel quality parameter threshold value reaches a time threshold value, determining the at least one data symbol that is to be retransmitted.

7. The method of claim 6, the method further comprising: determining the time threshold value at least according to the modulation and coding scheme that is used to send the data symbol to the receiver.

8. The method of claim 3, the method further comprising: sending, to the receiver, indication information that is correlated to the at least one data symbol that is to be retransmitted.

9. The method of claim 8, wherein the indication information comprises: information correlated to a position of the at least one data symbol, which is to be retransmitted, in an original data block of the at least one data symbol that is to be retransmitted; and the sending indication information comprises:
sending, to the receiver by using a signaling message, the information correlated to the position of the at least one data symbol, which is to be retransmitted, in the original data block.

10. The method of claim 8, the indication information comprising:
information correlated to a position of the at least one data symbol, which is to be retransmitted, in an original data block of the at least one data symbol that is to be retransmitted; and the sending indication information comprises:
adding, to a next data block to be sent to the receiver, the information correlated to the position of the at least one data symbol, which is to be retransmitted, in the original data block and the at least one data symbol that is to be retransmitted, and sending the next data block.

11. The method according to claim 2, wherein the channel quality parameter is correlated to one or more of the following parameters:
a signal-to-noise ratio (SNR), a carrier-to-noise ratio (CNR), a signal-to-interference-plus-noise ratio (SINR), a carrier-to-interference-plus-noise ratio (CINR), a bit error rate (BER), channel attenuation, a delay, channel state information (CSI), a channel transmission matrix, and a channel quality indicator (CQI).

12. An auxiliary method for determining channel quality, the method comprising:
generating at least one reference signal, wherein the at least one reference signal is used for a sender to determine, at least according to the at least one reference signal, quality of a channel at a corresponding moment when a data symbol is sent to a receiver; and
at the same time when the sender sends the data symbol by using the channel, sending the generated at least one reference signal by using the channel.

13. The method of claim 12, the method further comprising:
determining at least one data symbol that is retransmitted by the sender; and
recovering, at least according to the retransmitted at least one data symbol, data sent by the sender.

14. The method of claim 13, wherein the determining at least one data symbol that is retransmitted by the sender comprises:
acquiring indication information correlated to the retransmitted at least one data symbol; and
determining the retransmitted at least one data symbol at least according to the indication information.

15. The method of claim 14, wherein the acquiring indication information correlated to the retransmitted at least one data symbol comprises:
acquiring, at least according to a signaling message from the sender, information that is comprised in the signaling message and is correlated to a position of the retransmitted at least one data symbol in an original data block.

16. The method of claim 14, wherein the acquiring indication information correlated to the retransmitted at least one data symbol comprises:
acquiring, at least according to a data block from the sender, information correlated to a position of the retransmitted at least one data symbol in an original data block, and the retransmitted at least one data symbol.

17. An apparatus for determining channel quality, the apparatus comprising:
a transceiver, configured to: at the same time when a data symbol is sent to a receiver by using a channel, receive at least one reference signal by using the channel;
a memory, configured to store an instruction; and
a processor, configured to execute the instruction stored in the memory, wherein the instruction causes the processor to execute the following steps:
controlling the transceiver to: at the same time when the data symbol is sent to the receiver by using the channel, receive the at least one reference signal by using the channel; and
determining, at least according to the at least one reference signal, quality of the channel at a corresponding moment when the data symbol is sent to the receiver.

18. An auxiliary apparatus for determining channel quality, the apparatus comprising:
a transceiver, configured to: at the same time when a sender sends a data symbol by using a channel, send at least one reference signal by using the channel;
a memory, configured to store an instruction; and
a processor, configured to execute the instruction stored in the memory, wherein the instruction causes the processor to execute the following steps:
generating the at least one reference signal, wherein the at least one reference signal is used for the sender to determine, at least according to the at least one reference signal, quality of the channel at a corresponding moment when the data symbol is sent to a receiver; and
controlling the transceiver to: at the same time when the sender sends the data symbol by using the channel, send the generated at least one reference signal by using the channel.

19. The apparatus of claim 17, wherein the instruction causes the processor to further execute:
determining, at least according to the at least one reference signal, at least one channel quality parameter of the channel at the corresponding moment when the data symbol is sent to the receiver; and
determining the quality of the channel at least according to the at least one channel quality parameter.

20. The apparatus of claim 19, wherein the instruction causes the processor to further execute:
determining, at least according to the quality of the channel, at least one data symbol that is to be retransmitted.

21. The apparatus of claim 20, wherein the instruction causes the processor to further execute:
in response to that the at least one channel quality parameter is less than a corresponding channel quality parameter threshold value, determining that the data symbol of the corresponding moment is to be retransmitted.

22. The apparatus of claim 20, wherein the instruction causes the processor to further execute:
    determining, at least according to the at least one reference signal and a modulation and coding scheme that is used to send the data symbol to the receiver, the at least one data symbol that is to be retransmitted.

23. The apparatus of claim 22, wherein the instruction causes the processor to further execute:
    in response to that an accumulated time of moments during which the at least one channel quality parameter is less than a corresponding channel quality parameter threshold value reaches a time threshold value, determining the at least one data symbol that is to be retransmitted.

24. The apparatus of claim 20, wherein the instruction causes the processor to further execute:
    sending, to the receiver, indication information that is correlated to the at least one data symbol that is to be retransmitted.

25. The apparatus of claim 24, wherein the instruction causes the processor to further execute:
    sending, to the receiver by using a signaling message, the information correlated to the position of the at least one data symbol, which is to be retransmitted, in an original data block.

26. The apparatus of claim 24, wherein the instruction causes the processor to further execute:
    adding, to a next data block to be sent to the receiver, the information correlated to the position of the at least one data symbol, which is to be retransmitted, in an original data block and the at least one data symbol that is to be retransmitted, and sending the next data block.

27. The apparatus of claim 18, wherein the instruction causes the processor to further execute:
    determining at least one data symbol that is retransmitted by the sender; and
    recovering, at least according to the retransmitted at least one data symbol, data sent by the sender.

28. The apparatus of claim 27, wherein the instruction causes the processor to further execute:
    acquiring indication information correlated to the retransmitted at least one data symbol; and
    determining the retransmitted at least one data symbol at least according to the indication information.

29. The apparatus of claim 28, wherein the instruction causes the processor to further execute:
    acquiring, at least according to a signaling message from the sender, information that is comprised in the signaling message and is correlated to a position of the retransmitted at least one data symbol in an original data block.

30. The apparatus of claim 28, wherein the instruction causes the processor to further execute:
    acquiring, at least according to a data block from the sender, information correlated to a position of the retransmitted at least one data symbol in an original data block, and the retransmitted at least one data symbol.

* * * * *